ent Pump, R. T. Albo, Apr. 1965.

United States Patent [19]
Krupp

[11] 4,081,224
[45] Mar. 28, 1978

[54] APPARATUS FOR COMPRESSING GAS IN RESPONSE TO VEHICULAR TRAFFIC

[76] Inventor: Walter H. Krupp, 9350 Bolsa Ave., #61, Westminster, Calif. 92683

[21] Appl. No.: 742,984

[22] Filed: Nov. 18, 1976

[51] Int. Cl.² .................. F04B 35/00; F04B 45/04
[52] U.S. Cl. .................................. 417/229; 417/244
[58] Field of Search ............. 417/229, 244, 478, 479, 417/480

[56] References Cited

U.S. PATENT DOCUMENTS

| 20,045 | 4/1858 | Cumming | 417/244 |
|---|---|---|---|
| 282,070 | 7/1883 | Garsed | 417/229 |
| 862,867 | 8/1907 | Eggleston | 417/390 |
| 1,515,702 | 11/1924 | Reybold | 417/480 |
| 1,771,200 | 7/1930 | Akers | 417/229 |
| 2,060,890 | 11/1936 | Olafson | 417/229 |
| 2,267,280 | 12/1941 | Kuhnel | 417/480 |
| 2,333,614 | 11/1943 | Boyd | 417/229 |
| 2,884,093 | 4/1959 | Stewart | 417/229 |
| 3,072,317 | 1/1963 | Kodra | 417/265 |
| 3,216,648 | 11/1965 | Ford | 417/265 |
| 3,306,215 | 2/1967 | Sebastiani | 417/244 |

OTHER PUBLICATIONS

IBM Technical Disclosure Bulletin, Positive Displacement Pump, R. T. Albo, Apr. 1965.

*Primary Examiner*—Carlton R. Croyle
*Assistant Examiner*—R. E. Gluck
*Attorney, Agent, or Firm*—Edward A. Sokolski

[57] ABSTRACT

A plurality of actuator members are mounted along the surface of a roadway in the path of vehicular traffic, so as to be actuated as the wheels of vehicles pass thereover. Beneath each actuator is a chamber formed of resilient material, one of the walls of this chamber being deflected inwardly in response to an associated actuator. The chambers are filled with gas and connected to each other in series by means of a suitable valving arrangement. The gas contained within the chambers, which is preferably air, is compressed by virtue of the actuation of the chamber, gas being fed from chamber to chamber such that successively higher gas compression levels will be reached at succeeding chamber stages in the chain. To facilitate the actuation of the higher level compression stages the actuation surfaces thereof are made to have a decreased area so that greater force per unit area can be provided for a given weight vehicle. Thus, highly compressed and heated gas can be generated for use in driving various types of machinery.

12 Claims, 6 Drawing Figures

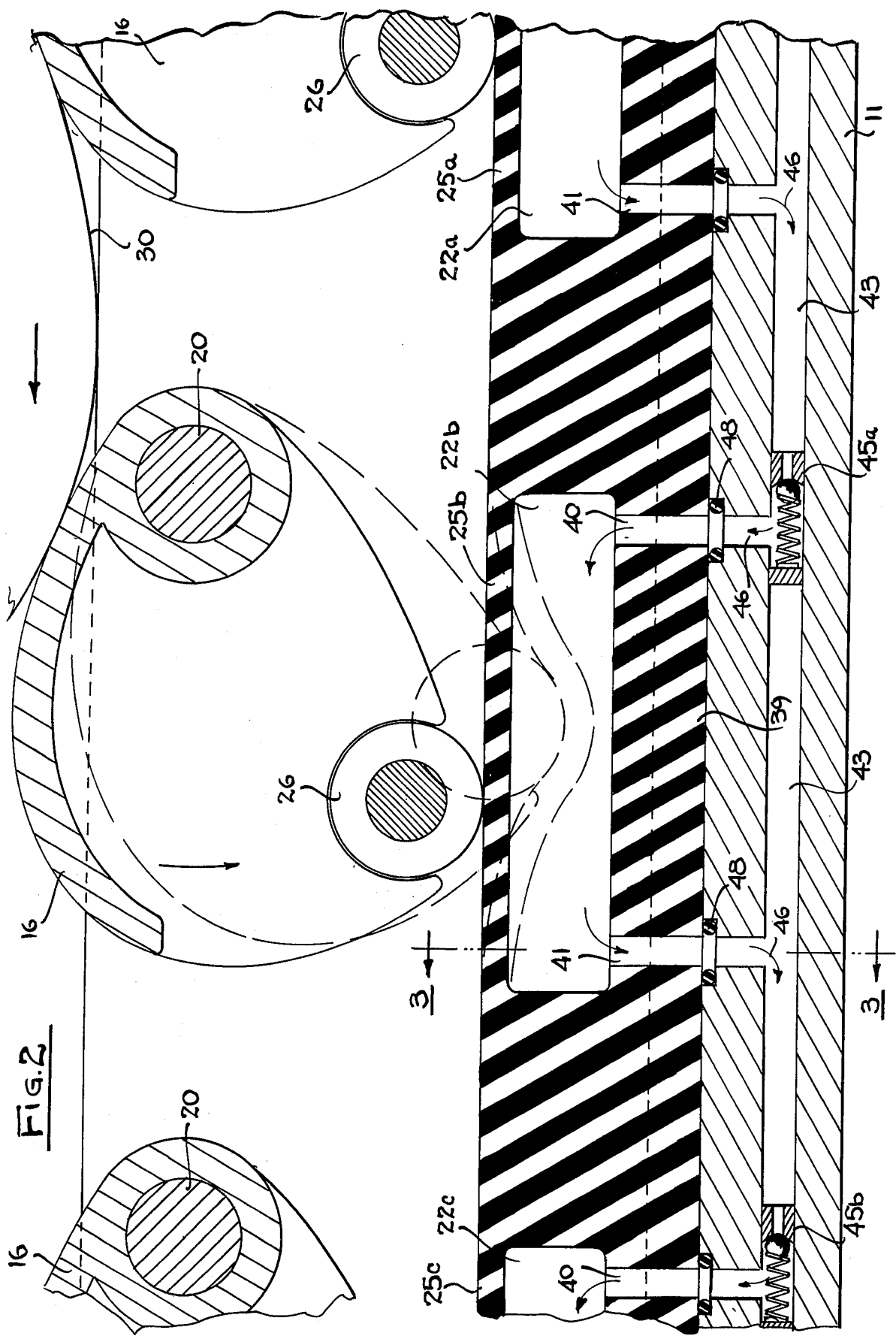

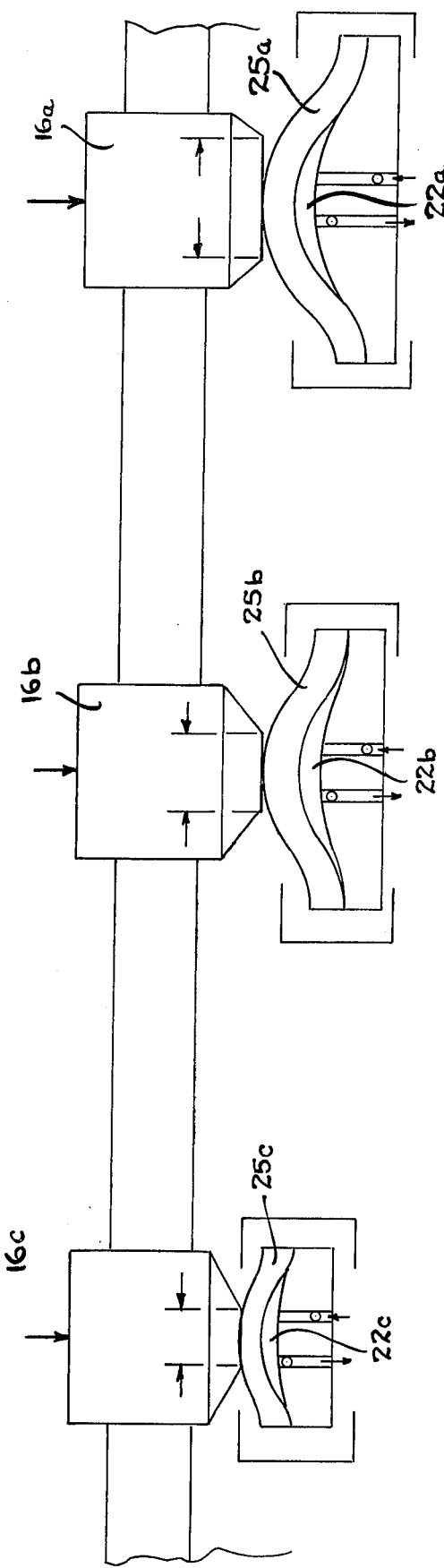
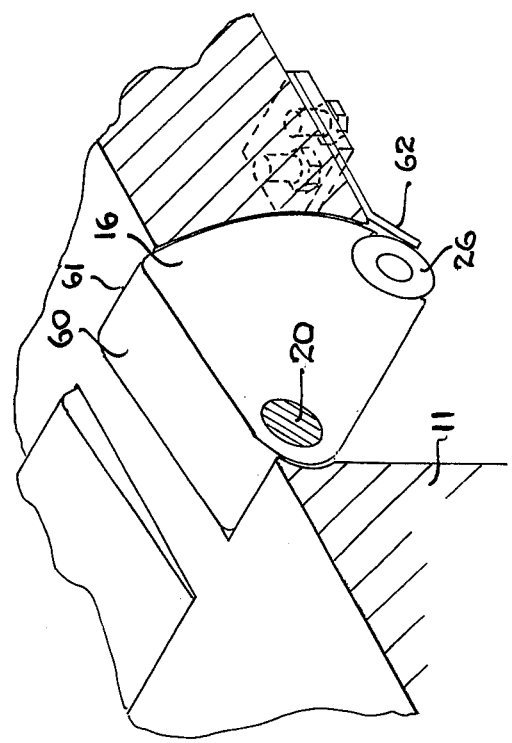
Fig. 5
Fig. 6

APPARATUS FOR COMPRESSING GAS IN RESPONSE TO VEHICULAR TRAFFIC

This invention relates to an apparatus and method for generating compressed heated gas and more particularly to such apparatus and technique wherein vehicular traffic is utilized to provide the input energy.

With the great need for conserving energy, many avenues are being explored to tap unused energy sources. In this vein, thought has been given to harnessing the large amount of energy dissipated every day by the wheels of vehicles as they move along roadway surfaces. Efforts to utilize the force developed between vehicle wheels and roadway surfaces in the generation of compressed air (or other compressed gas) is the subject of a number of prior art patents including the following:

U.S. Pat. No. 3,918,844 issued Nov. 11, 1975
U.S. Pat. No. 1,126,109 issued Jan. 26, 1915
U.S. Pat. No. 2,333,614 issued Nov. 2, 1943
Pat. No. 2,060,890 issued Nov. 17, 1936
U.S. Pat. No. 1,771,200 issued July 22, 1930
U.S. Pat. No. 2,020,361 issued Nov. 12, 1935.

All of the devices of these patents are inherently limited in their capacity to compress the gas to a high level in view of the fact that they rely on the use of single low level compression stages (which may involve several stages connected in parallel), no means being provided to build the compression level up between successive cascaded stages. Further, many of these prior art devices are integrated with the roadway so that they cannot be readily removed for replacement or repair. Also, certain of these prior art devices protrude appreciably from the roadway surface so that they are a significant impediment to traffic.

The present invention overcomes the aforementioned shortcomings of the prior art by employing a plurality of compression elements which are connected together in series or cascade to provide compression stages having successively higher compression levels, each stage feeding a successively higher level stage. Further, the actuators of the present invention are constructed and arranged on a roadway surface so as to provide a low profile and thus present no significant impediment to traffic. Also, to facilitate removal and repair of the compression units and actuators with a minimum interruption of traffic on the roadway, the actuator and compressor units of the invention are made so that they can readily be removed and reinstalled from roadside in a relatively short period of time.

It is therefore an object of this invention to provide improved means for utilizing energy generated by vehicular traffic to compress gas.

It is a further object of this invention to provide a device for utilizing vehicular traffic to compress gas which is capable of achieving higher compression ratios.

It is still another object of this invention to provide a device for compressing gas in response to vehicular traffic which presents a minimum impediment to such traffic.

It is still another object of this invention to provide a device for compressing gas in response to vehicular traffic which can be readily removed from and reinstalled in or under a roadway surface.

Other objects of this invention will become apparent as the description proceeds in connection with the accompanying drawings of which:

FIG. 2 is an elevational view in cross section illustrating the actuator units and compression chambers of the preferred embodiment;

FIG. 5 is a schematic representation illustrating varying actuator surface areas utilized in successive compression stages in the device of the invention; and FIG. 6 is a perspective view illustrating a type of actuator which may be used in the device of the invention.

Briefly described, my invention is as follows:

A plurality of actuator members are placed alongside each other on the surface of a roadway in a position where they can be readily actuated by passing traffic. Placed under each actuator for actuation thereby is a chamber filled with air or other gas, at least one of the walls of which is formed of a resilient material. When any actuator is actuated by a passing vehicle, the resilient wall of the associated chamber is pressed inwardly thereby compressing the gas within the chamber. The chambers are interconnected in series or cascade, such that each chamber feeds gas into a succeeding chamber which is at a higher compression level. Thus, successively higher compressions of the gas are attained in succeeding chambers, the last of these chambers providing an output at a relatively high level of compression. To facilitate the actuation of chambers which are at higher compression levels, the actuators for these higher level chambers may be designed with an actuation surface having a substantially smaller area than that of the actuators for the lower level chambers. Further, the actuators and compression chambers may be packaged in an integral unit which can be easily and rapidly installed in and removed from the roadway surface for replacement or repair.

Figure 1:
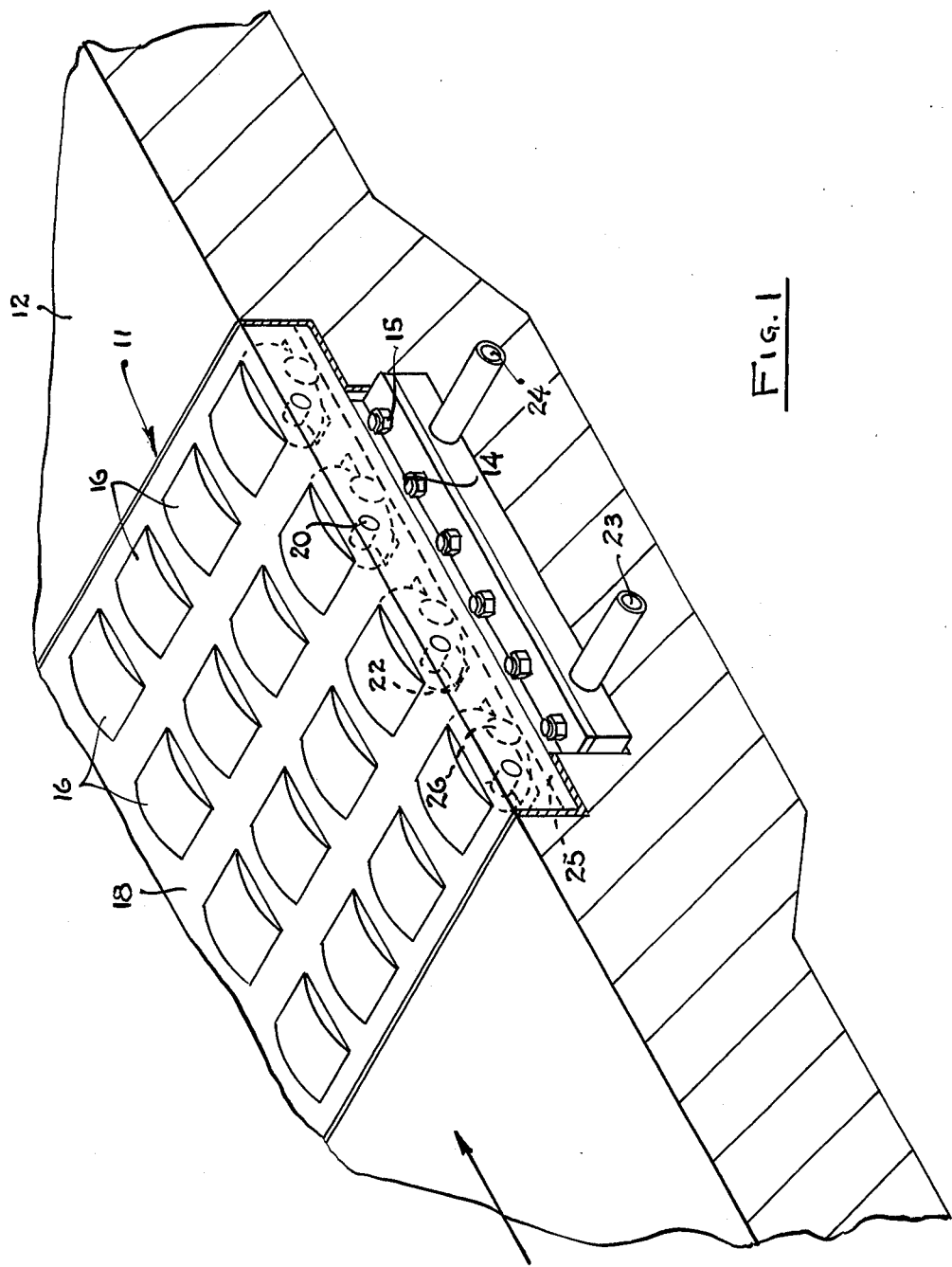
FIG. 1 is a perspective view illustrating a preferred embodiment of the invention installed in a roadway surface.

Referring now to FIG. 1, a preferred embodiment of the invention is illustrated in its installed position in a roadway. Frame 11 in which the device of the invention is mounted is installed in roadway 12, being retained in the roadway bed by means of bolts 14 and nuts 15 only some of which are shown. Pivotally mounted in frame 11 are a plurality of actuator members 16, these members being fitted in apertures formed in top plate 18 and pivotally supported on shafts 20. Supported under each actuator member is an associated chamber 22 having walls 25 formed of a resilient material such as a suitable rubber or plastic material which may be reinforced with steel.

As to be explained more fully further on in the specification, chambers 22 are interconnected with each other in a series or cascaded arrangement such that the gas in succeeding chambers is brought to successively higher compression levels. Gas in inletted to the first chamber in the chain through inlet line 23 and the compressed output is provided from the last chamber in the series from outlet line 24. The gas utilized is generally air drawn from the ambient atmosphere, but may comprise some other inert gas such as nitrogen or helium.

Figure 3:
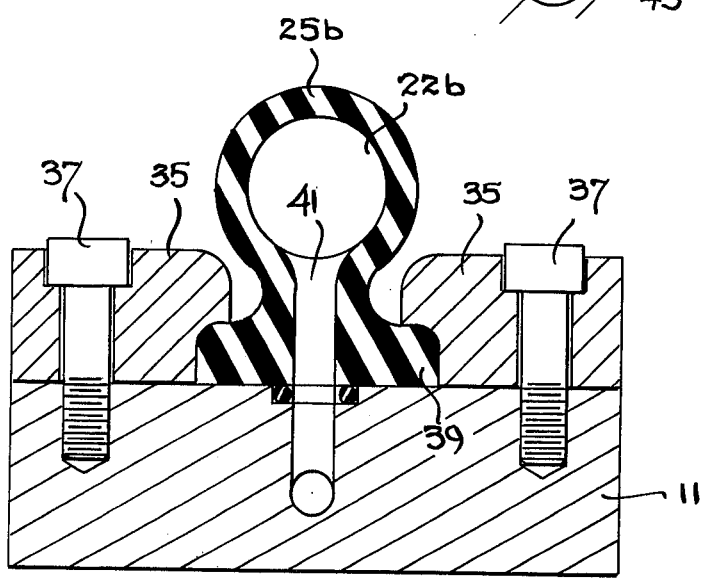
FIG. 3 is a cross sectional view taken along the plane indicated by 3—3 in FIG. 2.

Referring now to FIGS. 2 and 3, a preferred embodiment of the invention is illustrated. Actuators 16 are pivotally mounted on shaft 20 and have pivotally mounted thereon rollers 26 which ride on the top surfaces 25a–25c of chambers 22a–22c respectively. As shown in FIG. 2, a vehicle wheel 30 is about to actuate the actuator 16 shown in the center of the drawing. Incipient actuation of this actuator and resultant deflection of chamber wall 25b is shown in outline. As can be seen in FIG. 3, the sidewalls of the chambers are retained on frame 11 by means of longitudinal tabs 35 which are held to the frame by means of bolts 37. The chambers 22a–22c are generally tubular in form and have base portions 39 which are clamped to frame 11 by means of tabs 35 as just explained. Gas inlet channels 40 are formed in the base portions 39 of each of the chambers for enabling the entrance of gas to the chamber from a preceding chamber while exit channels 41 are formed in the base portion for exiting gas to a succeeding chamber. Channels 43 are provided in frame 11 to interconnect the chambers, one-way mechanism check valves 45 being provided in channel 43 between successive chambers to permit pressurized air flow only in the direction indicated by arrows 46. O-rings 48 are provided between the base portions 39 of the chambers and frame 11 along channels 40 and 41 to prevent the leakage of air at these points.

It thus can be seen from FIG. 2 that when the air pressure in chamber 22a reaches a predetermined level with compression beyond this level, the compressed air is released through valve 45 to chamber 22b. Likewise when the pressure in chamber 22b reaches a predetermined higher level, pressurization above this level results in the release of gas to chamber 22c through valve 45b, and so on until the last stage is reached which has the highest pressurization level of the chain. Valves 45a, 45b, etc. are check valves which will open in response to different predetermined pressure levels, valve 45b, having a higher response level than valve 45a, with each succeeding valve having a successively higher response level. The compression chambers may be formed from a suitable resilient material such as a rubber of the type used for fabricating automobile tires, a suitable plastic or a rubber or plastic material reinforced with fabric or metal.

Figure 4:
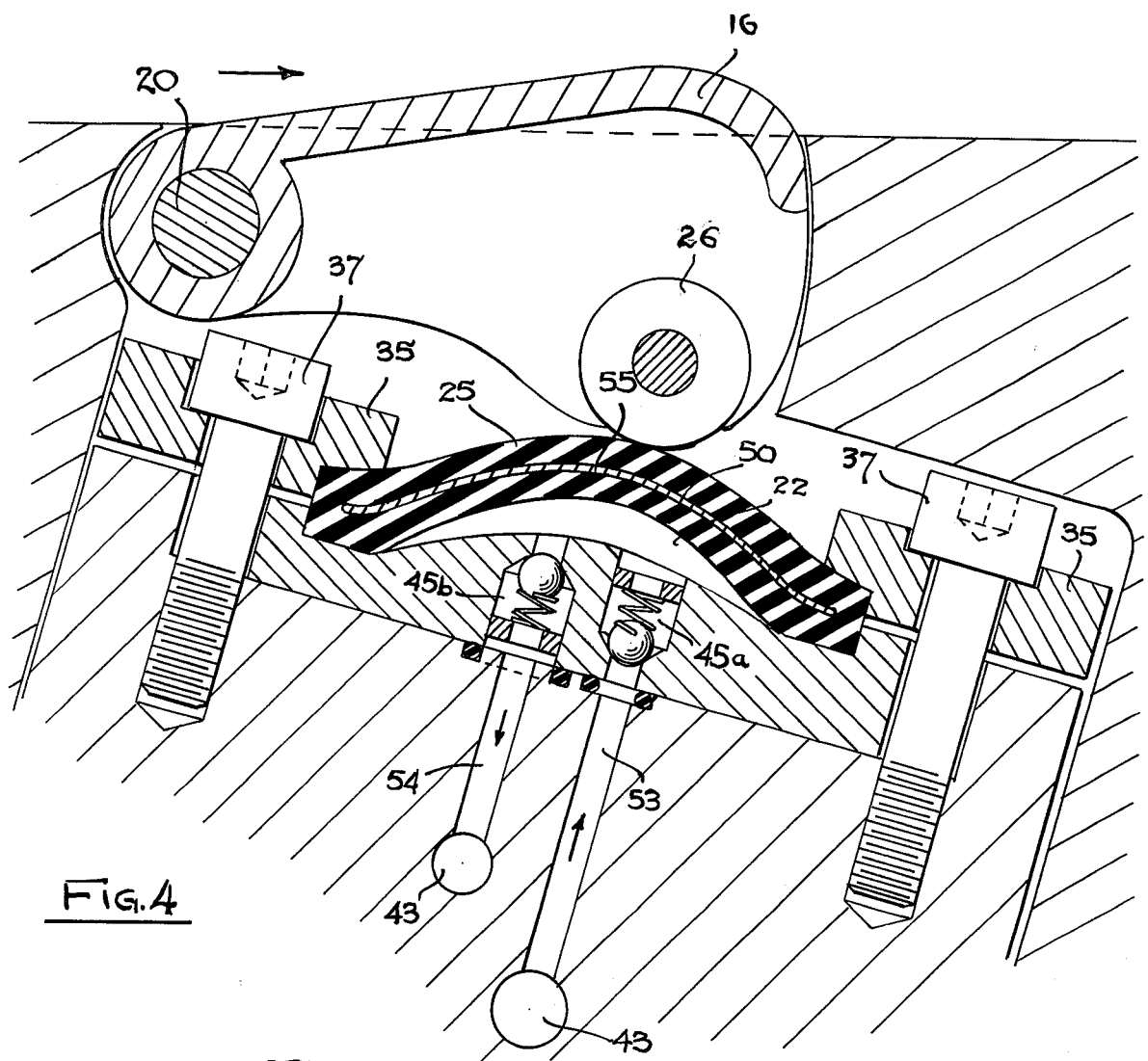
FIG. 4 is a cross sectional view illustrating an actuator and compression chamber of a second embodiment of the invention.

Referring now to FIG. 4, a single chamber and actuator of a second embodiment of the invention is illustrated. This second embodiment operates in the same manner as the first and differs only in the specific structure of the actuator and compression chamber. Compression chamber 22 is formed from a folded-over piece of flexible material such as rubber or plastic 25, which has a sheet of resilient metal 55 which may be of steel sandwiched therebetween. The unit is formed in the general shape of a dome or mushroom with the central portion being raised and the ends being clamped tightly against frame 11 by means of longitudinal tabs 35 and bolts 37. Actuator 16 is pivotally supported on pin 20 and actuated to depress the walls of chamber 22 through the intermediary of roller 26 in response to vehicular traffic as in the previous embodiment. Pressurized gas from a preceding chamber in the compression chain passes from channel 43 and channel 53 through check valve 45 into chamber 22. When the predetermined pressure level for the chamber is exceeded, pressurized gas passes out of the chamber through check valve 45b to channels 54 and 43 on to a succeeding chamber. Thus operation is basically the same as that described for the previous embodiment.

Chamber 22 could also be formed in the same mushroom or dome shape, as shown in FIG. 4, but entirely of an elastic metal such as steel rather than in the plastic-metal sandwich configuration of FIG. 4.

Referring now to FIG. 5, a preferred implementation for the actuators and chambers is schematically illustrated. In FIG. 5, chamber 22b has a higher pressurization level than chamber 22a, while chamber 22c has a higher pressurization level than chamber 22b. In order to accommodate the different force levels required to actuate the various chambers, the contact area against the associated chamber wall for actuator 16b is made less than that for actuator 16a, while the contact area for actuator 16c is made less than that for actuator 16b. In this manner, a greater force per unit area is provided for the chambers at higher pressurization levels.

Referring now to FIG. 6, a preferred embodiment of the actuator mechanism of the invention is illustrated. Actuator 16 is in the general shape of a segment of a cylinder and has a flat top portion 60 and an arcuate front portion 61. The actuator is pivotally mounted on pivot pin 20 which is attached to frame 11. Rotatably mounted on the bottom portion of the actuator is roller 26 which contacts the compression chamber wall. A leaf spring 62 which is fixedly supported on frame 11 extends beneath the actuator and operates to restore the actuator to its initial (unactuated) position after a vehicle wheel has passed over the actuator. This assures return of the actuator to its initial position in situations where the compression level in the chamber is relatively low and may not provide sufficient force to achieve this end result.

It is to be noted that the invention can be implemented in conjunction with many different types of vehicles, including railroad trains, the tracks for which provide the roadway with the actuator being mounted on the tracks.

While the invention has been described and illustrated in detail, it is to be clearly understood that this is intended by way of illustration and example only and is not to be taken by way of limitation, the spirit and scope of this invention being limited only by the terms of the following claims.

I claim:
1. Apparatus for compressing gas in response to vehicular traffic on a roadway comprising:
   a plurality of actuator members,
   means for movably supporting said actuator members on the surface of the roadway for individual random actuation by said traffic,
   a plurality of chambers each having at least one resilient top wall beneath an associated one of said actuator members, said resilient top walls being pressed inwardly by their associated actuator members when said actuator members are actuated so as to compress the gas within the associated chamber, and
   means for providing fluid interconnections between said chambers whereby the chambers are connected together with each other to form a series chain of chambers, the contact areas between the actuator members and chambers and the volume of the chambers being successively smaller for each succeeding chamber in said series chain, the gas in succeeding chambers in the series chain being brought to successively higher compression levels.
2. The apparatus of claim 1 wherein the means for movably supporting said actuators on the surface of the roadway comprises a frame removably installed in said roadway at the surface thereof and means for pivotally supporting the actuator members on said frame.

3. The apparatus of claim 1 wherein said chambers are formed of a resilient material having a substantially tubular form.

4. The apparatus of claim 1 wherein the central portion of the top wall is raised such that said top wall is dome shaped.

5. The apparatus of claim 1 wherein said chambers are formed of a folded over piece of flexible material having a sheet of resilient metal sandwiched therebetween, the central portion of the top wall being raised such that said top wall has the general shape of a dome.

6. The apparatus of claim 1 wherein said means for providing interconnections between said chambers comprises a channel running between each chamber and a succeeding chamber in the series chain, and a check valve placed in each of said channels for permitting gas flow through said channels in one direction from a chamber at a lower compression level to a chamber at a higher compression level, said valves each being adapted to open at a successively higher pressure level.

7. The apparatus of claim 2 wherein said chambers have base portions between which inlet channels to the chambers are formed and further including clamping means for clamping said base portions to said frame.

8. The apparatus of claim 2 and further including spring means for resiliently urging said actuators inwardly from the roadway surface.

9. The apparatus of claim 8 wherein said spring means comprises a leaf spring mounted on said frame beneath each of said actuators.

10. The apparatus of claim 2 wherein said actuator members have rollers therein which ride against the surfaces of the associated chambers.

11. Apparatus for compressing gas in response to vehicular traffic on a roadway comprising:
- a plurality of actuator members, each of said actuator members being in the general shape of a segment of a cylinder and having a substantially flat top portion, an arcuate front portion and a bottom portion having a roller rotatably mounted thereon,
- means for rotatably mounting said actuator members along the surface of the roadway for individual random actuation by the traffic,
- a plurality of chambers each having at least one resilient top wall portion located beneath an associated one of said actuators and in contact with the roller thereof, said resilient top walls being pressed inwardly by their associated rollers when the actuator members are actuated so as to compress the gas within the associated chamber, and
- means for providing fluid interconnections between said chambers to enable one-way fluid flow from chamber to chamber, the chambers thereby being connected together with each other to form a series chain of chambers, the contact areas between the rollers and chambers and the volume of the chambers being successively smaller for each succeeding chamber in said series chain, whereby the gas in succeeding chambers is brought to successively higher compression levels.

12. The apparatus of claim 11 wherein the chambers are generally tubular in shape and have base portions extending outwardly therefrom, a support frame, and means for clamping said base portions to said frame.

* * * * *